United States Patent
Baas

(10) Patent No.: US 10,456,971 B2
(45) Date of Patent: Oct. 29, 2019

(54) MOLD FOR FORMING A HOLLOW BODY AND INFLATABLE BODY

(71) Applicant: Zamqua Holding B.V., Lisse (NL)

(72) Inventor: Fred Baas, Nieuw Vennep (NL)

(73) Assignee: Zamqua Holding B.V., Lisse (NL)

( * ) Notice: Subject to any disclaimer, the term of this patent is extended or adjusted under 35 U.S.C. 154(b) by 736 days.

(21) Appl. No.: 14/747,434

(22) Filed: Jun. 23, 2015

(65) Prior Publication Data

US 2015/0375440 A1 Dec. 31, 2015

(30) Foreign Application Priority Data

Jun. 26, 2014 (NL) .................................... 2013075

(51) Int. Cl.
| | |
|---|---|
| *B29C 49/28* | (2006.01) |
| *B66F 3/35* | (2006.01) |
| *B29C 33/30* | (2006.01) |
| *B29C 33/48* | (2006.01) |
| *B29L 22/02* | (2006.01) |
| *B64F 1/22* | (2006.01) |

(52) U.S. Cl.
CPC ............ *B29C 49/28* (2013.01); *B29C 33/301* (2013.01); *B29C 33/485* (2013.01); *B66F 3/35* (2013.01); *B29L 2022/02* (2013.01); *B64F 1/22* (2013.01)

(58) Field of Classification Search
CPC ..... B29C 33/301; B29C 33/485; B29C 49/28; B66F 3/35; B64F 1/22; B29L 2022/02
See application file for complete search history.

(56) References Cited

U.S. PATENT DOCUMENTS

| | | | | |
|---|---|---|---|---|
| 3,160,691 | A | * 12/1964 | Chupa | .................. B29C 41/003 249/96 |
| 3,192,568 | A | * 7/1965 | Nicholls | ................. B29C 33/02 249/111 |
| 3,282,757 | A | 11/1966 | Brussee | |
| 3,815,863 | A | * 6/1974 | Andeweg | ................ B29C 33/50 249/152 |

(Continued)

FOREIGN PATENT DOCUMENTS

| EP | 0626338 A1 | 5/1994 |
|---|---|---|
| EP | 2960033 B1 | 4/2018 |

(Continued)

OTHER PUBLICATIONS

European Search Report corresponding to International Patent Applicataion EP 15173941 dated Mar. 31, 2016.

(Continued)

*Primary Examiner* — Joseph S Del Sole
*Assistant Examiner* — Emmanuel S Luk
(74) *Attorney, Agent, or Firm* — Jenkins, Wilson, Taylor & Hunt, P.A.

(57) ABSTRACT

A mold comprises a mold body (1) for forming therearound a body (60) with a body cavity which is accessible via an opening. The mold body is assembled from a set of mutually cohesive body parts (30,40). The body parts (30,40) are mutually releasable and removable from the body via the opening. An inflatable body (60) can be manufactured with the mold. The inflatable body (60) comprises a wall of elastomer material, which wall at least in an inflated state of the body bounds a body cavity accessible through a wall opening. The body is inflatable by filling the body cavity with a fluid.

9 Claims, 6 Drawing Sheets

(56) References Cited

U.S. PATENT DOCUMENTS

| | | | | |
|---|---|---|---|---|
| 4,070,434 | A | * | 1/1978 | Noda .................. B29C 41/003 137/223 |
| 4,100,249 | A | * | 7/1978 | Giron ...................... B28B 7/303 249/139 |
| 4,705,468 | A | | 11/1987 | LeBreton |
| 4,780,262 | A | * | 10/1988 | VonVolkli ............ B29C 70/342 264/101 |
| 6,419,476 | B1 | * | 7/2002 | Ouellette ................ B29C 45/27 425/567 |
| 2007/0098831 | A1 | | 5/2007 | Yoon |
| 2010/0032862 | A1 | | 2/2010 | Micheaux et al. |
| 2010/0323051 | A1 | * | 12/2010 | Helenius ............. B29C 45/4421 425/161 |
| 2013/0146745 | A1 | | 6/2013 | Foster et al. |

FOREIGN PATENT DOCUMENTS

| | | |
|---|---|---|
| GB | 2332638 A | 6/1999 |
| JP | S 63-194914 A | 8/1988 |
| JP | 2011-083944 A | 4/2011 |
| NL | 1034099 C2 | 1/2009 |

OTHER PUBLICATIONS

Extended European Search Report corresponding to European Patent Application EP 15173941.4 dated Apr. 8, 2016; retrieved from Global Dossier on Oct. 18, 2018

European Grant Decision for European Patent Application Serial No. EP 15173941.4 dated Mar. 8, 2018; retrieved from Global Dossier on Oct. 18, 2018.

Written Opinion corresponding to Netherlands Patent Application Serial No. NL 2013075 dated Jul. 2006; retrieved from Global Dossier on Oct. 18, 2018.

Netherlands Search Report corresponding to Netherlands Patent Application Serial No. NL 2013075 dated Mar. 4, 2015; retrieved from Global Dossier on Oct. 18, 2018.

* cited by examiner

MOLD FOR FORMING A HOLLOW BODY AND INFLATABLE BODY

CROSS-REFERENCE TO RELATED APPLICATIONS

The present U.S. patent application claims priority to Dutch Patent Application Serial No. 2013075, filed Jun. 26, 2014, the disclosure of which is incorporated herein by reference in its entirety.

The present invention relates to a mould with a mould body for forming therearound a body with a body cavity which is defined by the mould body and accessible via an opening.

Such a mould is applied to enable large-scale production of hollow bodies, such as for instance cushions filled with liquid, air or other gas, and other types of inflatable product. For the purpose of manufacturing the hollow body a layer of a material suitable for the purpose, such as an optionally fibre-reinforced plastic or rubber, is arranged against an outer side of the mould, wherein a shape of the mould defines a shape of the body cavity of the body in question. After a forming process, in which for instance a certain degree of curing of the layer of material takes place, the mould is removed from the body. In order to form a cavity in the body use is usually made as mould in known processes of a so-called 'lost core' mould, wherein the mould body is removed from the hollow body via an opening of the hollow body after the forming process. The space initially taken up inside the hollow body by the mould here forms the cavity in the body following removal of the mould.

A known mould of the type stated in the preamble thus makes use of a mould body of foam which, after the hollow body has been formed thereagainst, is broken apart into smaller fragments, which fragments can be removed via the opening of the hollow body. The foam provides a sufficiently strong mould body to enable the hollow body to be formed thereagainst, while the mould body can still be taken apart afterward in relatively simple manner using simple means, for instance chemically or via breaking tools which can be inserted through the opening of the hollow body and as far as the mould body.

A drawback of such a known mould is that the mould body is lost after being used once, so that a separate mould body has to be manufactured for each manufacturing process of a hollow body. Breaking of the mould into fragments with a maximum size allowing removal from the hollow body via the opening is moreover laborious and time-consuming work, especially when use is made of a relatively small opening to the body cavity. Such a relatively small opening is often desirable since a dimension of the opening defines, among other factors, the strength of the final hollow body.

The present invention has for its object to obviate the stated drawback.

In order to achieve the intended object a mould of the type stated in the preamble is characterized according to the invention in that the mould body is assembled from a set of mutually cohesive body parts, that the body parts are mutually releasable and that the body parts are removable via the opening. By making use of a mould body assembled from mutually cohesive and releasable body parts it is possible, after the process of forming the hollow body, to take the mould body apart in reusable manner and to remove the separate body parts in order to form a cavity in the hollow body. The removal of the body parts from the produced body takes place in simple manner via an opening provided in the hollow body. An integrity of the body parts is not affected here, so that these body parts can be reused in a subsequent production process so as to form a new suitable mould body therefrom. The mould body can thus be used time and again to produce a large number of hollow bodies therewith.

In a particular embodiment the mould according to the present invention is characterized in that the body parts comprise a primary type of body part with a first coupling member and a secondary type of body part with a second coupling member complementary to the first coupling member, which first and second coupling members are coupled in mutually releasable manner. The mould body is thus formed by at least two types of body part, each with its own coupling member, for mutually releasable coupling of the body parts. Within the context of the present invention it is however also possible to make use of a mould body constructed from a number of identical body parts. The body parts can be provided here with coupling means which allow a mutual coupling of the body parts in order to form the mould body and allow mutual release of the body parts in order to take apart the mould body after the production process and enable the removal of the separate body parts from the hollow body via the opening.

A further particular embodiment of a mould according to the present invention has the feature that the first coupling member comprises a coupling part extending laterally from another part of the primary type of body part and that the second coupling member complementary thereto comprises in the secondary type of body part a recess into which the coupling part fits closely in order to mutually couple the body parts. Such a coupling of a laterally protruding coupling part with complementary recess is relatively simple and allows the body parts to be released in reusable manner.

In a preferred embodiment a mould according to the present invention is characterized in that the body parts form a mould wall closed all around which bounds a mould cavity in the mould body, which mould cavity is accessible via a mould opening in the mould wall. The mould cavity provides for a considerable weight reduction relative to a solid mould body. The body cavity moreover provides the space necessary to enable mutual release and removal of the body parts.

In a further preferred embodiment a mould according to the present invention thus has the feature that the body parts comprise an internal side facing toward the mould cavity and an opposite external side, that the coupling part of the primary type of body part is provided on the internal side and that the recess of the secondary type of body part is open on the internal side in order to allow the primary type of body part to be released in the direction of the cavity from a secondary type of body part coupled thereto. Because the coupling part and recess are provided here on an internal side of the body parts, the body parts are mutually releasable in a transverse direction toward the interior. Despite a hollow body formed against an external side of the body parts, the body parts can thus be released from each other.

In order to enable the mould body to be taken apart in simple manner by releasing the body parts from each other following a manufacturing process of a hollow body using the mould, in a further preferred embodiment of a mould according to the present invention the body parts are characterized in that each of the body parts comprises an engaging member which extends from the mould wall into the mould cavity and is accessible through the mould opening.

Although the engaging member can be embodied in many ways here, a practical and simple manner is found to be that of a hook-like free edge in the mould cavity. The hook-like free edge can be accessed either directly in manual manner or for instance with an auxiliary means suitable for the purpose via an opening in the hollow body formed round the mould. By then applying a force to the edge in a direction of the opening the associated body part is pulled from the mould wall and into the cavity, whereby this body part is released from the connecting body parts. The body part can then be removed easily from the formed hollow body via the opening.

A further particular embodiment of the mould according to the present invention has the feature here that the primary type of body part comprises a first type of engaging member and that the secondary type of body part comprises a second type of engaging member differing visually from the first type of engaging member. The secondary type of body part is thus also removable from the mould body in roughly the same way by engaging on the second type of engaging member. Because the second type of engaging member differs visually here from the first type of engaging member, the primary and secondary types of body part in the mould body can be clearly distinguished from each other. This makes a controlled removal of the body parts easier, and it is for instance convenient to first remove all body parts of a first type of body part from the mould body before removing the body parts of the second type of body part.

In a particular embodiment the mould according to the present invention is characterized in that the mould body comprises two at least substantially identical cup-like shell parts lying opposite each other. Making use of cup-like shell parts results in a mould body with two mutually opposite poles formed by the top of each of the shell parts and a curved surface extending therebetween. Using the mould an inflatable body with a curved elastomer wall can hereby be manufactured which will stretch uniformly during inflation of the inflatable body. The at least substantially identical cup-like shell parts can each be constructed in the same way from separate body parts. The mould can hereby be manufactured by forming the shell parts with separate body parts, after which the two shell parts are simply coupled to each other with a free edge opposite each other so as to form the mould body. Because the body parts form part of one of the shell parts here, a length dimension of the body parts covers a maximum of only half a meridian of the mould body, so that the body parts are removable in relatively simple manner through the opening of the manufactured hollow body.

A further preferred embodiment of the mould according to the present invention has the feature that the primary type of body part and the secondary type of body part are coupled alternately in a shell part so as to form the shell part. Making use of alternately placed body parts enables the mould body to be formed wholly from only the two different types of body part, whereby construction of the mould body from the separate body parts is exceptionally simple.

A further particular embodiment of the mould according to the present invention has the feature that the body parts of at least one of the primary type of body part and the secondary type of body part in a shell part widen at an outer end from a top of the shell part toward an opposite outer end on a central periphery of the mould body. A cup-like shell part is hereby obtained just by coupling the body parts. Both types of body part preferably extend in the same way here from the top to the central periphery of the mould body. In the case of a relatively large mould body however, in which there is a large dimensional ratio of the relatively small top and the relatively large central periphery of each shell part, it is particularly only the body parts of one type which extend as far as the top. This prevents the body parts having a particularly narrow and thereby vulnerable outer end close to the top of a shell part.

In a further preferred embodiment the mould according to the present invention is characterized in that the body parts in a first of the cup-like shell parts lie offset relative to the corresponding body parts in an opposite shell part. A body part can hereby be removed from one of the shell parts, wherein an opposite body part in the opposite shell part is still partially attached at the central periphery to a further body part positioned adjacently of the removed body part. This prevents such an opposite body part becoming unintentionally or prematurely detached from another part of the mould body, which may result in separate body parts inside the space bounded by the mould body which are difficult to reach and thereby difficult to remove.

According to the present invention, the mould body can in principle be manufactured from diverse types of material, such as from a metal or a natural product such as wood. In a further preferred embodiment however, the mould according to the present invention has the feature that the body parts are of plastic. Body parts of plastic are relatively light in weight, which is a great advantage in a production process for an inflatable body. The plastic body parts are moreover relatively durable, whereby the mould body can be assembled and subsequently taken apart a relatively large number of times before the body parts need to be replaced. Release of an inflatable body formed against the mould body from plastic body parts also takes place relatively easily, wherein a prearranged release means over an outer side of the mould body is not necessary.

A further particular embodiment of the mould according to the present invention has the feature that the mould body is provided at a top with an integral attaching body with a central passage in line with the mould opening, this attaching body having a free side and an opposite attaching side to which body parts of the mould body are attached, and wherein a space is provided between the opposite sides which extends from a lateral side of the attaching body in the direction of the central opening.

The attaching body serves here on the one hand for attaching thereto at least a number of the separate body parts of the mould body, so that these body parts can be easily positioned during construction of the mould body, while during taking apart of the mould body and removal of one or more adjacent body parts in the mould body, the body parts attached to the attaching body nevertheless still remain attached at a position. This further prevents the mould body with the body parts falling apart in uncontrolled manner when a body part is taken out of the mould body. The attaching body serves on the other hand for fixing to a wrapping device with which material for the body to be manufactured can be wrapped round the mould body.

A further particular embodiment of the mould according to the present invention has the feature that the attaching body is provided on a surface in the central passage with an internal screw thread for coupling to an external screw thread complementary thereto. A wrapping device with a rotating drive shaft, which is provided with the complementary external screw thread, can hereby be coupled in the central passage to the attaching body so as to enable a rotation to be imparted to the mould body, so that a material for the body to be manufactured can be wrapped around the mould body.

The present invention also relates to an inflatable body which can be manufactured by means of a mould according to the present invention and which comprises a wall of elastomer material, which wall at least in an inflated state of the body bounds a body cavity accessible through a wall opening, and wherein the body is provided in the wall opening with a form-retaining attaching body from which the wall extends radially, which attaching body comprises a main part with a central passage which lies in line with the opening in the wall and allows a free access to the body cavity, and comprises an edge part extending radially from the main part and lying against a side of the wall directed toward the body cavity.

Such an inflatable body is for instance known as heavy-duty support cushion for supporting and lifting large loads, such as for instance for supporting overturned vehicles and crashed aircraft. Owing to the elastomer material the wall is sufficiently flexible to be brought from a relatively compact storage state into a relatively inflated state of the body. The body cavity is filled here with air or another type of gas until a desired internal pressure is obtained in the body, whereby the body is brought into the inflated state and is sufficiently strong to bear a relatively great counter-pressure of a load weight placed thereon.

The body cavity can be reached via a wall opening to enable a mould body against which the wall is formed to be removed from the body cavity. Provided in the wall opening is an attaching body with which the inflatable body is attached during a forming process thereof to the mould body. The attaching body comprises a main part with a central passage which lies in line with the opening in the wall and allows a free access to the body cavity so that the mould body can be removed in parts from the body cavity in unobstructed manner. An edge part extends radially from the main part and lies against a side of the wall directed toward the body cavity so that the attaching body hooks with the edge part behind the wall. In order to completely fix the attaching body to the wall in the known inflatable body a cover is screwed onto the attaching body after curing of the wall, so enclosing an outer end of the wall. The outer end of the wall lies clamped between the attaching body and the cover here such that undesirable release therefrom is prevented even in the case of high forces.

The application of such a cover is however rather laborious and requires a tight closure between the cover and the attaching body to be able to ensure an airtightness of the inflatable body after manufacture.

An inflatable body of the above described type is therefore characterized according to the present invention in that the attaching body comprises a body part in one piece with a further edge part lying opposite the edge part and a space which is bounded on either side by the edge parts and extends from an edge of the attaching body as far as the main part and receives therein an outer end of the wall defining the wall opening. The present invention is based here on the insight that it is possible in a manufacturing process for the inflatable body to apply a wrapping process wherein wall material is wrapped round the mould body in a manner such that the material accumulates in the space between the edge parts and is fixed therein after curing. It has been found that the wall is hereby attached to the attaching body at least as reliably as in the known inflatable body. The application of a cover is not necessary here and, because the body part is in one piece, an airtightness thereof remains guaranteed.

A dimension of the central passage in the main part is preferably as small as possible since the passage dimension also determines a maximum strength of the inflatable body in the inflated state. A mould body optionally used for manufacture of the inflatable body is here removable in parts from the body cavity via the passage.

In a preferred embodiment the inflatable body according to the present invention is characterized in that the space between the edge parts comprises a V-groove which narrows from a lateral outer end of the attaching body in the direction of the main part. The inclining sides of the edge parts on either side of the V-groove guide the material of the wall into the deepest point in the groove during a manufacturing process. Weak spots which would decrease the reliability of the inflatable body are hereby prevented from occurring in the outer end of the wall.

In a further preferred embodiment the inflatable body according to the present invention is characterized in that the further edge part has an average thickness greater than an average thickness of the opposite edge part. Making the further edge part somewhat thicker makes it well able to withstand the tensile force of the wall exerted thereon when the inflatable body is being inflated. Less force is exerted on the edge part provided against the inner side of the wall, whereby a smaller average thickness of this part can suffice very well.

In a further preferred embodiment the inflatable body according to the present invention has the feature that the main part is provided on a surface in the central passage with an internal screw thread for the purpose of coupling to an external screw thread complementary thereto.

Although the inflatable body according to the present invention can be applied in many different fields, the inflatable body according to the present invention is particularly suitable as lifting cushion for lifting heavy loads, such as for instance heavy overturned vehicles, aircraft and other objects such as collapsed buildings. The lifting cushion is for instance applied here to lift a crashed machine from a ground surface during a recovery procedure. The wall of the inflatable body can be manufactured from different elastomer materials. In a further preferred embodiment however, the inflatable body according to the present invention is characterized in that the material of flexible form is a fibre-reinforced material. By making use of a fibre-reinforced material for the wall thereof the inflatable body has a strength such that extremely heavy loads can be reliably supported thereby.

The invention will now be further elucidated on the basis of a number of exemplary embodiments and an accompanying drawing. In the drawing.

Figure 1A:
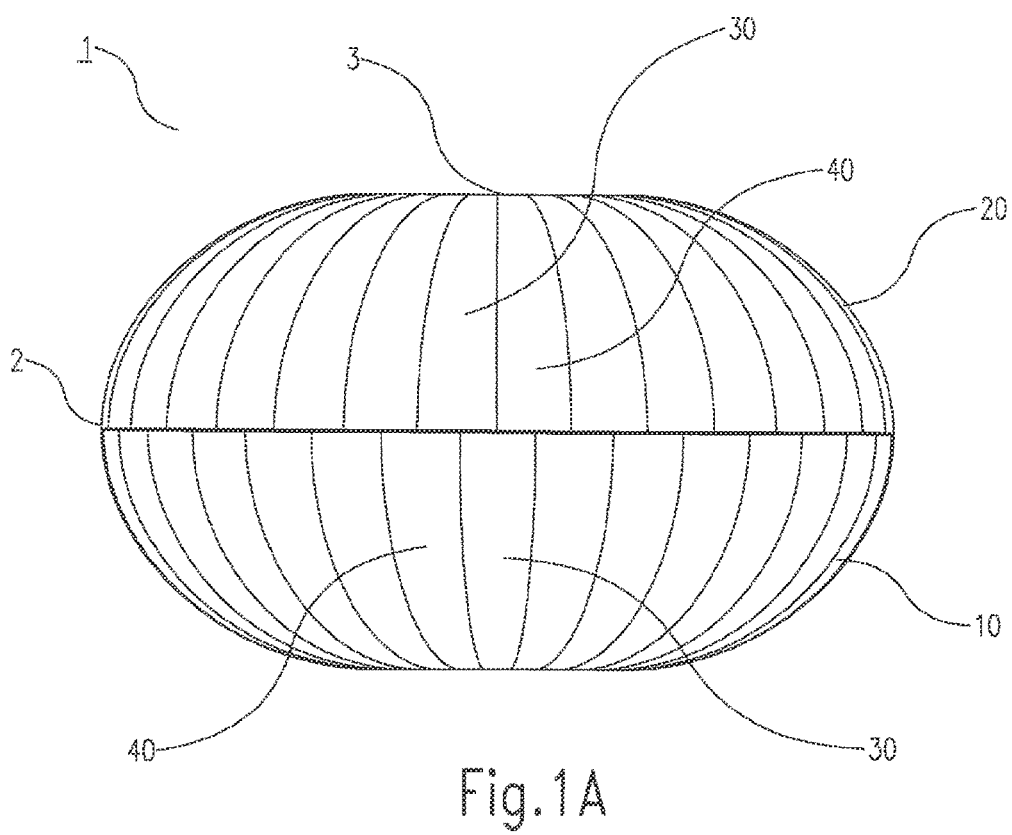
FIG. 1A is a front view of an exemplary embodiment of a mould according to the invention.

The figures are otherwise purely schematic and not drawn to scale. Some dimensions in particular may be exaggerated to greater or lesser extent for the sake of clarity.

Corresponding parts are designated as far as possible in the figures with the same reference numeral.

Figure 1B:
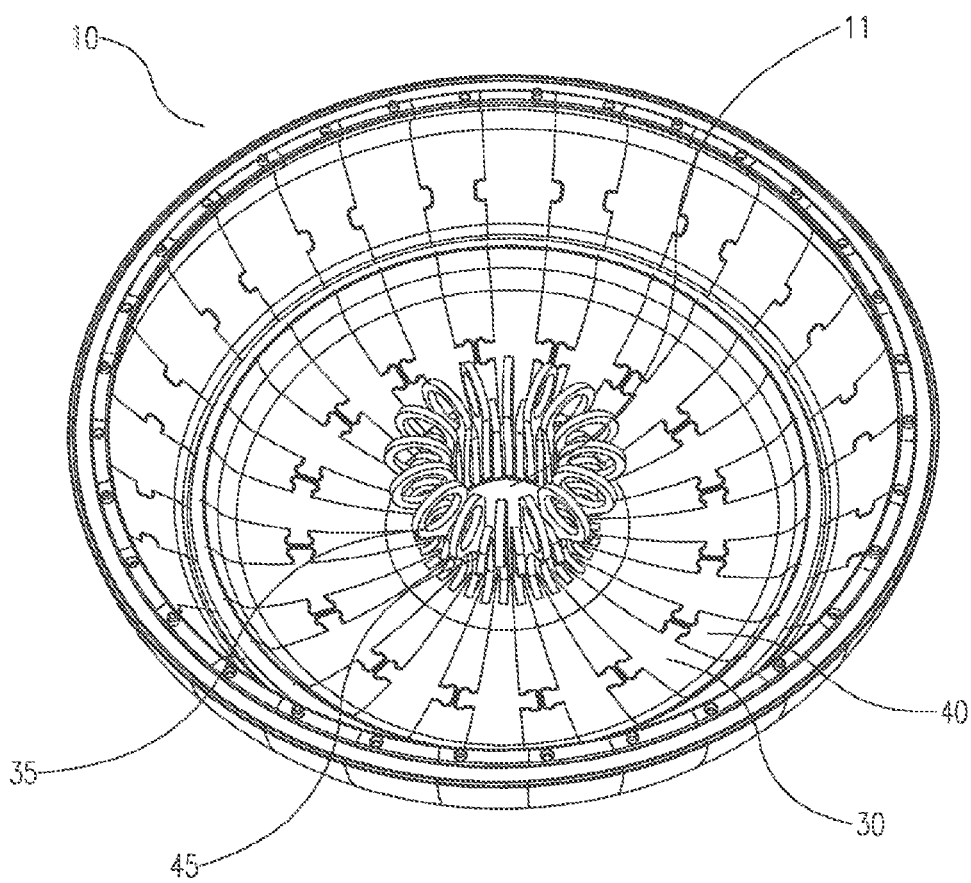
FIG. 1B is an internal perspective view of a lower half of the mould according to FIG. 1A.
Figure 1C:
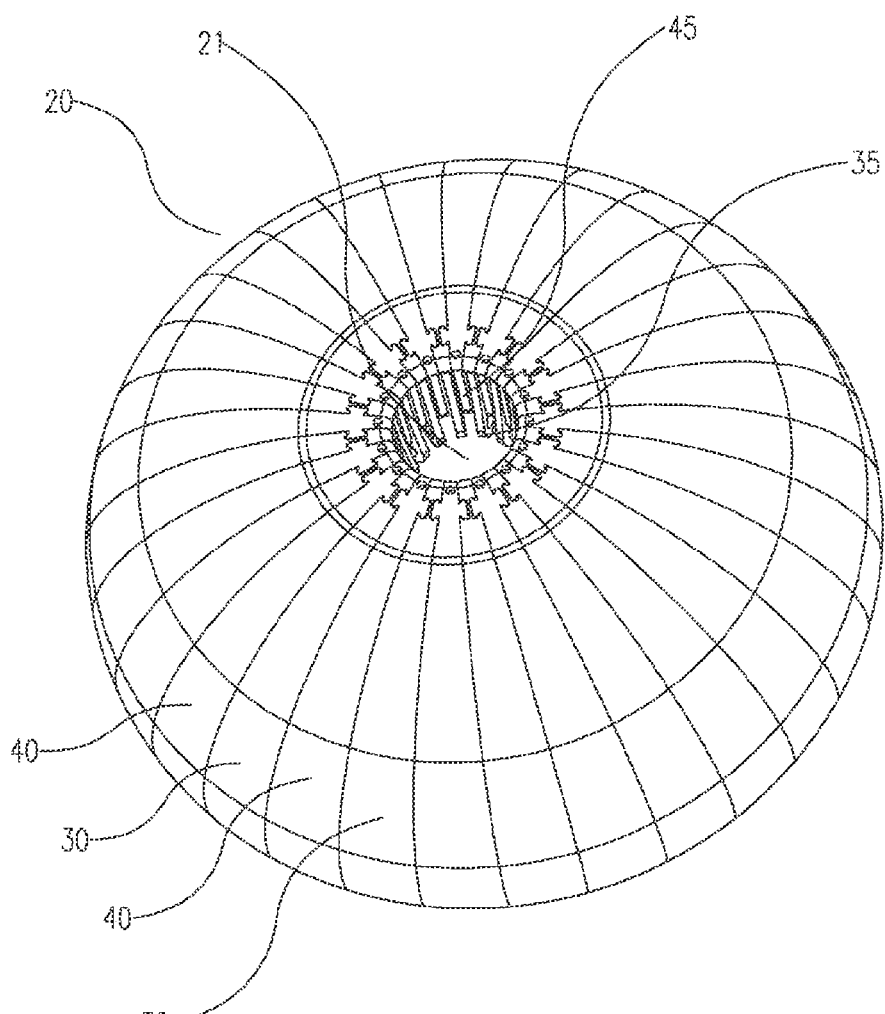
FIG. 1C is an external perspective view of an upper half of the mould according to FIG. 1A.

As shown in an exemplary embodiment in FIGS. 1A, 1B and 1C, a mould according to the present invention for forming a hollow body, particularly an inflatable body, therearound comprises a hollow mould body 1 in the form of an oblate ellipsoid with a widest central periphery 2 and an opening at the flat poles 3, i.e. a somewhat doughnut-shaped hollow mould body 1. In order to enable removal of the mould from the hollow body following the manufacturing process of the hollow body, mould body 1 is constructed from a number of relatively small cohesive body parts 30, 40 which are removable via an opening in the hollow body at the poles of the mould body.

As shown in FIG. 1A, mould body 1 is formed by a first cup-like shell part 10 and an at least substantially identical second cup-like shell part 20. The second cup-like shell part 20 is mirrored here relative to the first cup-like shell part 10. The free edges of shell parts 10,20 are mutually coupled at the central periphery 2 of the mould body. The cup-like shell parts 10,20 are constructed from a number of relatively thin, elongate and slightly curved body parts 30,40, each extending from a pole of the mould body to the central periphery of the mould body. Since a periphery of the mould body close to the poles is significantly smaller than the central periphery, each of the body parts tapers to a point here from a part at the central periphery in the direction of a part at the pole.

As is further shown clearly in FIG. 1A, the body parts of the first shell part and the second shell part do not lie in line but are offset to some extent in the peripheral direction. The corner points of body parts 30,40 on the central periphery do not lie opposite each other in the peripheral direction but at a mid-point of a width distance of the body parts in the peripheral direction. When a body part is removed from a shell part following the production process, an opposite body part in the opposite shell part is hereby prevented from becoming completely loose. The mould body can thus be taken apart in controlled manner, and premature uncontrolled falling apart of the body parts inside the hollow body is prevented.

As shown in FIG. 1B, the first cup-like shell part 10 is constructed from alternately coupled body parts of a primary type of body part 40 and secondary type of body part 30. Body parts 30,40 are provided at an outer end close to the pole of the mould body with an engaging member which can be gripped in order to release the body parts. The primary type of body part 40 here comprises a hook-like free edge 45, while the secondary type of body part 30 comprises a circular grip part 35 with gripping opening. At the pole the first cup-like shell part 10 has an opening 11 via which a released body part can be removed.

As shown in FIG. 1C, the second cup-like shell part 20 is at least substantially identical to the first cup-like shell part. This second cup-like shell part 20 also has an opening 21 on the opposite pole of the mould body. Engaging members 35,45 of body parts 30,40 are visually clearly recognizable through opening 21. Depending on a size of the opening, engaging members 35,45 can be accessed either directly by hand or for instance with an auxiliary means suitable for the purpose. By subsequently applying a force to engaging member 35,45 in a direction away from opening 21 the respective body part is pulled into the mould cavity, whereby this body part is released from the adjacent body parts. The released body part can then be carried easily through one of the openings 11, 21 of the shell parts by gripping on the engaging member in order to take the body part out of the formed hollow body.

Figure 2A:
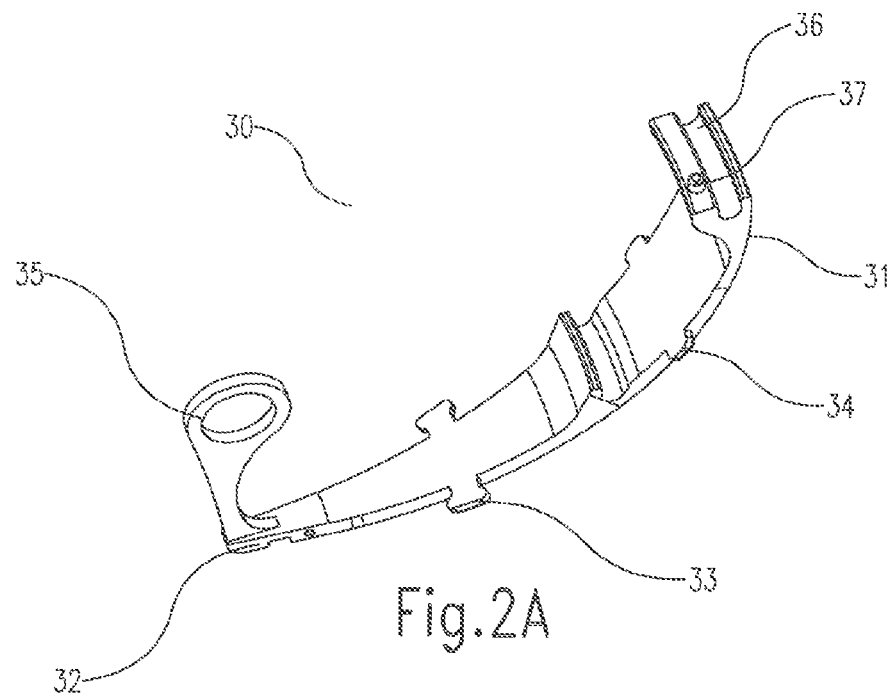
FIG. 2A is a detail view of an exemplary embodiment of a primary type of body part as applied in a mould according to FIG. 1A.
Figure 2B:
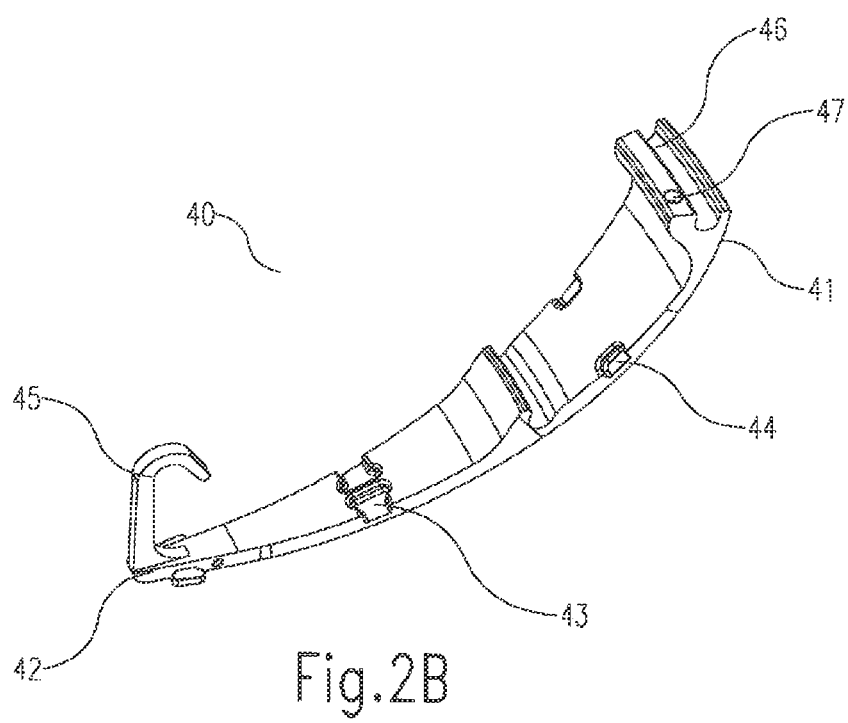
FIG. 2B is a detail view of an exemplary embodiment of a secondary type of body part as applied in a mould according to FIG. 1A.

As shown in more detail in FIGS. 2A and 2B, the primary type of body part 40 and the secondary type of body part 30 have a corresponding form. Both types of body part 30,40 comprise a relatively narrow elongate and curved element which widens steadily from a somewhat pointed part on a first side 32,42 in the direction of a widest part on the opposite side 31,41. On side 31,41 the types of body part 30,40 have a free edge part for coupling against a free edge part of an opposite body part. Provided in the edge part is a groove segment 36,46 which, together with the groove parts of the other body parts in the shell part as shown in FIG. 1B, forms a full groove all the way round on the central periphery. A body with a form which is to some extent flexible, such as an O-ring, can be arranged in the groove and holds together the body parts of the mould body in a shell part. This makes it much easier to construct the mould body from the individual body parts. Provided in the edge part of the primary type of body part 40 is a receiving cavity 47 into which fits a protrusion 37 on the edge part of the secondary type of body part 30. Fitting the protrusion 37 into receiving cavity 47 couples the body parts of the opposite shell parts to each other. The protrusion and receiving cavity moreover provide here for a correct alignment of the body parts relative to each other, wherein a body part from a first of the shell parts lies semi-offset relative to an opposite body part in a second of the shell parts.

The primary type of body part 40 comprises on either side in a width direction a number of recesses 43,44 in which a complementary coupling part 33,34 of a secondary type of body part 30 fits closely in order to realize a mutual fixing of body parts 30,40 in lateral direction. The body parts are thus coupled all the way round in the lateral direction inside a shell part of the mould body, while the body parts of the secondary type of body part 30 are releasable here in a transverse direction toward the interior. On the lateral sides the body parts comprise an inclining edge which imparts a release angle to the body parts, wherein all body parts of the secondary type of body part are removable first from the mould body. Once all body parts of the secondary type of body part have been taken out of the shell part, the body parts of the primary type of body part 40 can be removed. When all body parts have been taken out of the first shell part, the second shell part can then be taken apart in the same way by first removing the secondary body parts 30 and subsequently removing the primary body parts.

The mould according to the present invention can thus be constructed in relatively simple manner from the individual body parts so as to form a hollow body such as an inflatable cushion therearound, and be taken apart after use in order to remove the mould body as separate body parts from the body formed therearound so as to clear the cavity in the body. The body parts can be used time and again here in order to form a new mould therefrom for the purpose of forming a new hollow body therearound.

Figure 3:
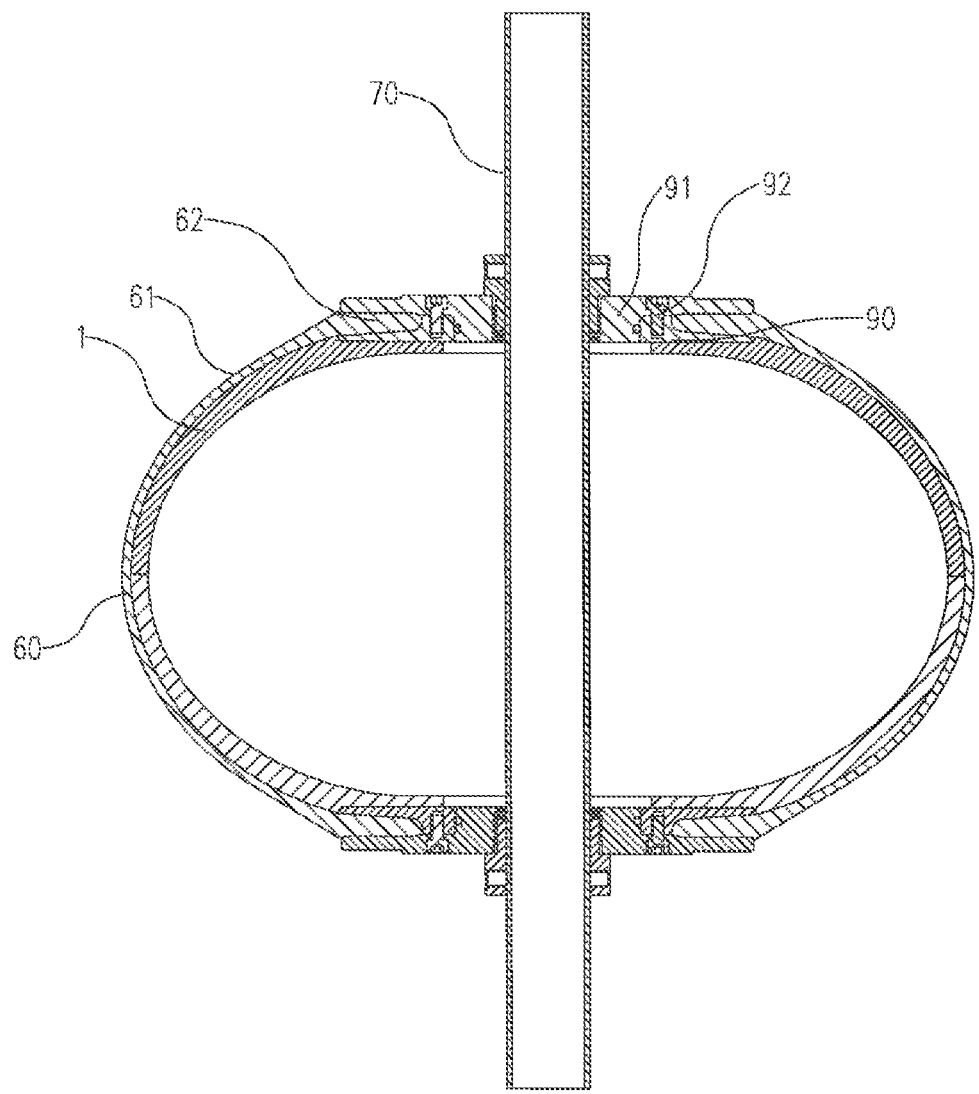
FIG. 3 is a cross-sectional view of a prior art inflatable body on a mould.

As shown in FIG. 3, a prior art inflatable body 60 is manufactured by means of a mould 1, wherein a wall 61 of elastomer material of inflatable body 60 is arranged round an outer side of mould 1. Body 60 leaves a wall opening to a body cavity bounded by wall 61. The body cavity can be accessed via the wall opening in order to enable removal from the body cavity of a mould body 1 against which wall 61 is formed. Provided in the wall opening is an attaching body 90 with which inflatable body 60 is attached during a forming process thereof to the mould body. The attaching body comprises a main part with a central passage lying in line with the opening in the wall and allowing a free access to the body cavity so that the mould body can be removed in parts from the body cavity in unobstructed manner. An edge part 90 extends radially from the main part and lies against a side of the wall directed toward the body cavity, so that attaching body 90 hooks with the edge part behind wall 61 when the wall is formed against mould body 1 and attaching body 90. In order to completely fix the attaching body to the wall in the known inflatable body a cover 91 is screwed onto the attaching body by means of fixation means 92 after curing of the wall, so enclosing an outer end 62 of the wall. Outer end 62 of wall 61 lies clamped between attaching body 90 and cover 91 here such that undesirable release therefrom is prevented even in the case of high forces.

Figure 4:
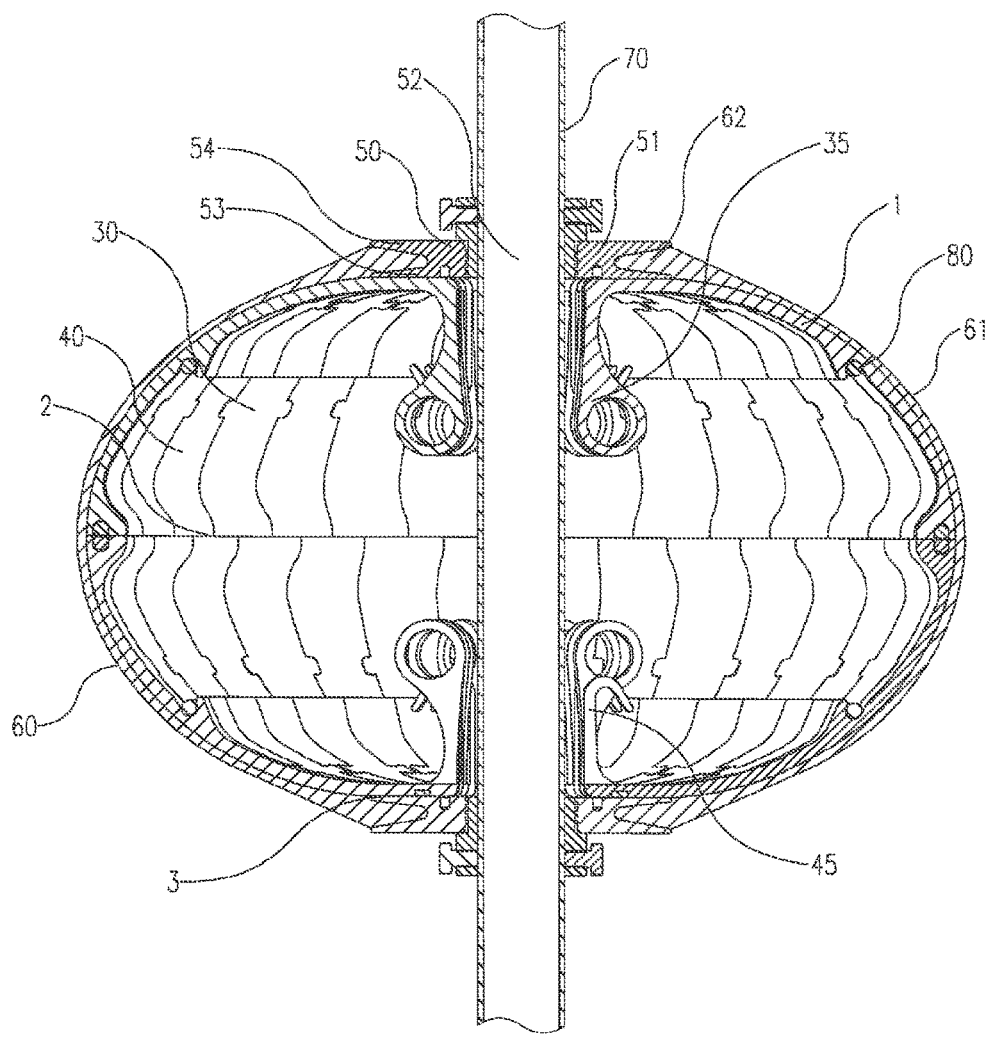
FIG. 4 is a cross-sectional view of an inflatable body according to the invention on a mould.

As shown in FIG. 4, an inflatable body 60 according to the present invention conversely comprises an attaching body 50 with a body part 51 formed integrally with an edge part 53 and a further edge part 54 lying opposite the edge part, and a space which is bounded on either side by the edge parts and extends from a side of the attaching body as far as the main part and receives therein an outer end 62 of wall 61 defining the wall opening. Wall material from which wall 61 is formed can be wrapped round the mould body by means of an adapted wrapping process in a manner such that the material accumulates in the space between edge parts 53,54 and is fixed therein after curing. Wall 61 is hereby attached to the attaching body at least as reliably as in the prior art inflatable body. The use of a cover which is screwed onto the main part is no longer necessary in this case. An airtightness of the body is ensured in that body part 51 is formed integrally with edge parts 53,54 and is thus seamless. On a surface in central passage 52 the attaching body 50 comprises an internal screw thread for coupling to an external screw thread complementary thereto. A wrapping device with a rotating drive shaft 70 can hereby be coupled to the attaching body in central passage 52 in order to enable a rotation to be imparted to the mould body so that a material for the body 60 to be manufactured can be wrapped round the mould body.

Although the invention has been further elucidated with reference to only a few exemplary embodiments, it will be apparent that the invention is by no means limited thereto. On the contrary, many other variations and embodiments are possible within the scope of the invention for the person with ordinary skill in the art.

The invention claimed is:

1. A mould with a mould body for forming therearound a body with a body cavity which is defined by the mould body and accessible via an opening,
    wherein the mould body is assembled from a set of mutually cohesive body parts, wherein the body parts are mutually releasable,
    wherein the body parts are removable via the opening,
    wherein the body parts comprise an engaging member which extends from the mould wall into the mould cavity and is accessible through the mould opening,
    wherein the body parts comprise a primary type of body part with a first coupling member and a secondary type of body part with a second coupling member complementary to the first coupling member, which first and second coupling members are coupled in mutually releasable manner,
    wherein the primary type of body part comprises a first type of engaging member,
    wherein the secondary type of body part comprises a second type of engaging member differing visually from the first type of engaging member,
    wherein the body parts form a mould wall closed all around which bounds a mould cavity in the mould body, which mould cavity is accessible via a mould opening in the mould wall, and
    wherein the first coupling member comprises a coupling part extending laterally from another part of the primary type of body part and the second coupling member complementary thereto comprises in the secondary type of body part a recess into which the coupling part fits closely in order to mutually couple the body parts.

2. The mould as claimed in claim 1, wherein the body parts comprise an internal side facing toward the mould cavity and an opposite external side, the coupling part of the primary type of body part is provided on the internal side, and the recess of the secondary type of body part is open on the internal side in order to allow the primary type of body part to be released in the direction of the cavity from a secondary type of body part coupled thereto.

3. The mould as claimed in claim 1, wherein the mould body comprises two at least substantially identical cup-like shell parts lying opposite each other.

4. The mould as claimed in claim 3, wherein the primary type of body part and the secondary type of body part are coupled alternately in a shell part so as to form the shell part.

5. The mould as claimed in claim 3, wherein at least one of the primary type of body part and the secondary type of body part in a shell part widen at an outer end from a top of the shell part toward an opposite outer end on a central periphery of the mould body.

6. The mould as claimed in claim 3, wherein the body parts in a first of the cup-like shell parts lie offset relative to the corresponding body parts in an opposite shell part.

7. The mould as claimed in claim 1, wherein the body parts are of plastic.

8. The mould as claimed in claim 1, wherein the mould body is provided at a top with an integral attaching body with a central passage in line with the mould opening, this attaching body having a free side and an opposite attaching side to which body parts of the mould body are attached, and wherein a space is provided between the opposite sides which extends from a lateral side of the attaching body in the direction of the central opening.

9. The mould as claimed in claim 8, wherein the attaching body is provided on a surface in the central passage with an internal screw thread for coupling to an external screw thread complementary thereto.

* * * * *